Patented May 15, 1951

2,553,308

UNITED STATES PATENT OFFICE 2,553,308

CYANALKYL ETHER PLASTICIZERS AND SYNTHETIC RESIN COMPOSITIONS PLASTICIZED THEREWITH

Donald Faulkner, Epsom, England, assignor to The Distillers Company Limited, Edinburgh, Scotland, a British company No Drawing. Application December 2, 1948, Serial No. 63,192. In Great Britain December 17, 1947

11 Claims. (Cl. 260—32.4)

The present invention relates to the plasticisation of polymeric compounds comprising vinylidene chloride units, and has as its object the provision of new plasticisers of improved stability and compatibility for incorporation into such compounds.

It has already been proposed in my co-pending application Ser. No. 706,506, filed October 29, 1946, corresponding to British Patent No. 603,817, to use an ether or mixture of ethers of the general formula

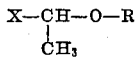

where X is phenyl, halogen-substituted or alkyl substituted phenyl and R is, inter alia, a saturated carbon chain containing at least one hydroxyl group, and it has already been proposed, in United States Patent No. 2,280,790, to use as plasticisers betacyanalkyl ethers of monohydric alcohols having an aliphatic chain or cycle interrupted by one or more oxygen or sulphur atoms, for example, betacyanethyl betaphenoxyethyl ether and the betacyanethyl ether of glycol monobenzyl ether.

We have now discovered that compounds having the general formula

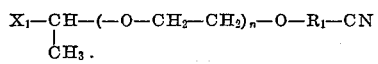

where $X_1$ is phenyl, mono- or dichlor-substituted phenyl or mono- or dimethyl substituted phenyl, $R_1$ is an alkylene radical of 2, 3 or 4 carbon atoms, to each of which carbon atoms is attached at least 1 hydrogen atom, and $n$ is 1 or 0, are plasticisers for polymeric compounds comprising vinylidene chloride units, showing improved compatibility as compared with their hydroxy analogues containing a hydroxyl group in place of the cyano group, and considerably improved stability (resistance to autoxidation) as compared with the corresponding benzyl alcohol derivatives. When $n$ is 0 in the above formula, the formula then becomes

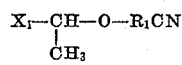

It will be appreciated that an alkylene radical having at least two carbon atoms is derived by removal of an atom of hydrogen from each of two different carbon atoms of a saturated aliphatic hydrocarbon, and is to be distinguished from the isomeric alkylidene radical, which is derived by removal of two atoms of hydrogen from a single carbon atom of the hydrocarbon.

The cyanalkylether plasticisers are believed to be new compounds. The cyanethyl ethers may be prepared by the condensation of acrylonitrile with the corresponding alcohols, namely phenyl methyl carbinol, its glycol ether or their nuclear substituted derivatives specified above; the 2-cyanpropyl and the cyanisopropyl ethers may be prepared similarly from methacrylonitrile and allyl cyanide or crotononitrile respectively, while the primary cyanpropyl and cyanbutyl ethers may be prepared by condensing styrene with 3-chlorpropanol or 4-chlorbutanol and subsequently reacting the chlorether thus produced with, say, sodium cyanide.

Suitable proportions of the cyanalkyl ethers in the plasticised compositions of the present invention are in the range 5–20% by weight of the resin, and it has been found that, in this range the plasticiser also exerts a stabilising effect in retarding the breakdown of the constituent vinylidene chloride units under the influence of heat and light.

The following six examples illustrate the preparation of representative members of the novel class of plasticisers:

Example 1

0.2 g. of sodium was dissolved in a solution of 30 g. of phenylmethyl carbinol in 50 ml. of benzene. This solution was warmed to 40° C., and 13 g. of acrylonitrile was added slowly, the temperature being kept at 40–45° C. by cooling. When the addition was complete, the temperature was maintained at 40–45° C. for 1½ hours, after which the solution was washed with dilute hydrochloric acid, then with water and dried. Removal of the benzene by distillation and fractionation of the residue gave 34 g. of alphamethylbenzyl beta-cyanethyl ether, b. pt. (1 mm. Hg) 72–74° C., $n_D^{20}$ 1.5045.

Example 2

25 g. of beta(alphamethylbenzyloxy) ethanol (prepared from styrene and ethylene glycol) were reacted with 6 g. acrylonitrile by the method described in Example 1, using the same times and temperature ranges. 24 g. of alphamethylbenzyl betacyanethoxyethyl ether were obtained, b. pt. (1 mm. Hg) 102–104° C., $n_D^{20}$ 1.5000.

*Example 3*

4-chlorbutanol was prepared by the action of hydrogen chloride on boiling tetrahydrofurane, as described in "Organic Syntheses," Coll. vol. II.

43 g. of styrene were added to a stirred mixture of 45 g. of 4-chlorbutanol, 1 g. of p-toluenesulphonic acid and 1 g. of pyrogallol at 80° C. during 3 hours and the mixture was then heated at 80° C. for 4½ hours, at 95–100° C. for 8 hours and finally at 110–115° C. for 3 hours. After washing with water, a little chloroform being added to aid separation, the mixture was fractionally distilled under 15 mm. Hg pressure to give 25 g. of styrene, a fraction b. pt. 64–70° C. containing alphachlorethyl benzene and a residue. Distillation of the residue at 1–2 mm. Hg pressure gave 29 g. of material b. pt. 70–75° C., refractionation of which gave 24 g. of alphamethylbenzyl 4-chlorbutyl ether b. pt. (1 mm. Hg) 64–67° C., $n_D^{20}$ 1.5020.

A solution of 12 g. of sodium cyanide in 18 ml. of water was added to a solution of 30 g. of this chlorether in 100 ml. of ethanol, and the mixture was refluxed for 7 hours. After cooling, the mixture was filtered to remove sodium chloride, and as much ethanol as possible was distilled from the filtrate under 150 mm. Hg. pressure. The residue was washed with water and extracted with ethyl acetate, and the extract was distilled to remove the solvent. Fractionation of the residue under 1 mm. Hg pressure gave 12 g. of unchanged chlorether, b. pt. 62–64° C. and 12 g. of alphamethyl benzyl-4-cyanbutyl ether, b. pt. (1 mm. Hg) 86–88° C., $n_D^{20}$ 1.4982.

*Example 4*

52 g. of parachlorphenyl methyl carbinol (which may be prepared from 4-chloracetophenone and sodium ethylate in alcohol, as described in Gaz. Chim. Ital. 45, (II) 272) and 18 g. of acrylonitrile were condensed in the presence of 0.35 g. of sodium and 60 ml. of benzene by the process described in Example 1. After washing and fractionating there were obtained 43 g. (83% yield) of alphamethyl parachlorbenzyl betacyanethyl ether, b. pt. (6–7 mm. Hg) 140–150° C., $n_D^{20}$ 1.5230.

*Example 5*

75 g. of alphaxylyl ethanol (i. e. methyl 2:4 dimethylphenylcarbinol, described in Berichte 35, 2248, and in Berichte 47, 2461) and 26.5 g. of acrylonitrile were condensed in the presence of 0.25 g. of sodium in the absence of any diluent but otherwise as described in Example 1. After washing and fractionating there were obtained 73 g. (72% yield) of alphamethyl 2:4 dimethyl benzyl betacyanethyl ether, b. pt. (1–2 mm. Hg) 150–151° C., $n_D^{20}$ 1.5170.

*Example 6*

0.2 g. of sodium were dissolved in a solution of 30 g. of phenyl methyl carbinol in 50 ml. of dry benzene, followed by 17 g. of allyl cyanide. The mixture was heated at 65–70° C. while stirring for 22 hours, then washed with dilute hydrochloric acid and with water, and freed from benzene by distillation. Fractionation of the residual liquid under reduced pressure gave 14.4 g. of unreacted phenyl methyl carbinol, followed by 19.8 g. of crude reaction product, b. pt. 100–107° C. under 1 mm. Hg pressure. Refractionation of this material afforded 17.0 g. of pure alphamethylbenzyl betacyanisopropyl ether, b. pt. 103–105° C. under 1 mm. Hg pressure, $n_D^{20}$ 1.4964.

Other alcohols which may be subjected to cyanalkylation with acrylonitrile, alphamethacrylonitrile, allyl cyanide or crotonoitrile to give members of the novel class of plasticisers of the present invention may be prepared by hydration of the now commercially available corresponding methyl-, dimethyl-, chlor- or dichlor styrenes, or they may be prepared by known procedures, for example, by reduction of the corresponding ketones or by Grignard synthesis from the corresponding aldehydes. Thus, methyl 3:4 dimethylphenyl carbinol has been prepared by reduction of 3:4 dimethylacetophenone (J. pr. Chem. (2) 41, 410), methyl 2:5 dimethylphenyl carbinol has been prepared from 2:5 dimethylacetophenone (Berichte 36, 1639), methyl 3:5 dimethylphenyl carbinol has been prepared from acetaldehyde and 3:5 dimethylphenyl magnesium bromide (Berichte 58, 47), methyl 2:4 dichlorphenyl carbinol has been prepared from 2:4 dichlorphenyl magnesium iodide and acetaldehyde (JCS, 1927, p. 1164), and methyl 2-chlorphenyl carbinol has been prepared from methyl magnesium bromide and 2-chlorbenzaldehyde (Berichte 58, 49).

The following examples illustrate the use of the novel cyanalkyl ethers in vinylidene chloride resin compositions.

*Example 7*

1 part by weight of alphamethylbenzyl betacyanethyl ether was intimately mixed with 10 parts by weight of a copolymer containing 89% w./w. of vinylidene chloride, 10% of vinyl chloride, and 1% of acrylonitrile by stirring with acetone and then removing the acetone by evaporation. The composition so obtained consisted of a fine white powder, which was then compressed into pellets. These were fed into the barrel of a small extrusion machine, constructed of nickel, and actuated by a piston. The machine was fitted with a nozzle 1/32" in diameter, and the barrel and nozzle were heated to 170° C. The composition was extruded through the nozzle to form a clear pale yellow monofilament of high strength. The degree of flow was very satisfactory, and no signs of decomposition were observed.

The above procedure was repeated with a copolymer containing 90% w./w. of vinylidene chloride and 10% of vinyl chloride. An almost colourless monofilament was obtained, and the flow properties of the composition were very satisfactory.

*Example 8*

1 g. of alphamethylbenzyl betacyanethoxyethyl ether was intimately mixed with 10 g. of a copolymer containing 90% w./w. of vinylidene chloride and 10% of vinyl chloride by stirring with acetone, and then evaporating off the solvent. The composition was pressed in a chromium-plated mould at 165° C. to give a disc about 1/8" thick. The composition showed good flow, and gave no evidence of decomposition, the disc obtained being pale yellow and translucent.

A similar composition was prepared from 1 g. of the above ether and 10 g. of a copolymer containing 95% w./w. vinylidene chloride and 5% acrylonitrile. This composition was pressed in a mould at 170° C. to give a pale amber-coloured disc showing good flow.

Example 9

An intimate mixture was prepared from 1 g. of alphamethylbenzyl 4-cyanbutyl ether and 10 g. of a copolymer containing 90% w./w. of vinylidene chloride and 10% of vinyl chloride. A disc ⅛" thick was moulded from this composition at a temperature of 170° and pressure of 8000 lb. p. s. i. A pale amber-coloured moulding resulted which showed good flow.

The above procedure was repeated with a copolymer containing 86% w./w. of vinylidene chloride, 12% of vinyl chloride and 2% of acrylonitrile. The resulting disc showed very good flow and was of a pale amber colour.

Example 10

1 g. of alphamethylparachlorbenzyl betacyanethyl ether and 10 g. of a copolymer containing 90% w./w. of vinylidene chloride and 10% of vinyl chloride were mixed intimately by adding acetone and stirring, and the acetone was removed by evaporation. A portion of the composition was extruded through a nozzle 3/32" in diameter at a temperature of 170° to give a clear, almost colourless monofilament showing no signs of decomposition.

A further portion of the composition was pressed in a chromium-plated mould at a temperature of 175–180°. The material flowed freely to give a tough, translucent, pale yellow disc ⅛" thick.

Example 11

10 g. of a ternary copolymer containing 88% w./w. of vinylidene chloride, 10% of vinyl chloride, and 2% of acrylonitrile were treated with a solution of 1 g. of alphamethyl 2:4-dimethylbenzyl betacyanethyl ether in 10 cc. of acetone, and stirred thoroughly. The acetone was then removed by drying, and the resulting composition was extruded through a nozzle 3/32" diameter at a temperteure of 170° C. The composition flowed freely, and formed a transparent pale yellow monofilament showing no signs of decomposition.

Example 12

A series of compositions of polyvinylidene chloride and plasticiser were prepared by treating the powdered polymer with a solution of plasticiser in acetone, stirring thoroughly and evaporating off the acetone. The resulting compositions were pressed at 180° C. in a nickel mould to give discs 1" in diameter and ⅛" thick. The plasticisers used and the appearance of the discs obtained are detailed in the following table:

| Plasticiser | Concentration per cent w./w. on the resin | Appearance of disc |
|---|---|---|
| | Per cent | |
| Alphamethyl parachlorbenzyl betacyanethyl ether. | 10 | Translucent, yellow, good flow. |
| Do | 15 | Translucent, yellow, very ready flow. |
| Alphamethyl 2:4-dimethylbenzyl betacyanethyl ether. | 20 | Very pale yellow, translucent, good flow. |

Example 13

A number of discs were prepared by the method described in Example 12, using a copolymer containing 85% by weight of vinylidene chloride and 15% of vinyl chloride. Their composition and appearance are detailed in the following table:

| Plasticiser | Concentration per cent w./w. on the resin | Appearance of disc |
|---|---|---|
| | Per cent | |
| Alphamethyl parachlorbenzyl betacyanethyl ether. | 5 | Pale brown, fairly good flow. |
| Alphamethyl benzyl betacyanethyl ether. | 8 | Pale orange, translucent, very good flow. |
| Alphamethyl benzyl betacyanisopropyl ether. | 10 | Somewhat pliable, very pale yellow. |
| Alphamethyl 2:4-dimethylbenzyl betacyanethyl ether. | 5 | Pale brown, fairly good flow. |

The superiority of these novel plasticizers in respect of oxidation resistance as compared with those derived from benzyl alcohol can be seen from the following experiment.

Benzyl alcohol was reacted with acrylonitrile as described for phenylmethyl carbinol in Example 1, to give benzyl betacyanethyl ether, b. pt. 100–102° C. under 2 mm. mercury pressure, $n_D^{20}$ 1.5128. A small quantity of this ether was placed in a watch glass, covered loosely with a second watch glass and allowed to stand in diffuse light at room temperature. After two weeks, the sample had acquired a strong odour of benzaldehyde, but no such oxidative change has been observed in similarly exposed samples of alphamethylbenzyl betacyanethyl ether or of any of the other cyanalkyl ethers described herein.

While the resins mentioned in the foregoing examples are mainly vinylidene chloride polymers and copolymers with vinyl chloride, it will be appreciated that the novel stabilisers may also be employed with other vinylidene chloride copolymers, which may incorporate two, three or more different monomeric units. Suitable examples of the latter include vinyl esters of organic acids such as vinyl acetate, vinyl methoxybutyrate and vinyl laurate, esters of acrylic, alphachloracrylic and alphamethacrylic acids with alkyl and cycloalkyl radicals of six or less carbon atoms, such as cyclohexyl methacrylate, butyl acrylate and ethyl chloracrylate, diesters of itaconic, maleic and fumaric acids with alkyl and cycloalkyl radicals of six or less carbon atoms, acrylonitrile, methacrylonitrile and crotononitrile.

Substances described but not claimed herein are claimed in my copending application, Serial No. 188,486, filed October 4, 1950.

I claim:

1. A plasticised composition comprising a polymeric resin containing a major proportion of vinylidene chloride units in its molecular structure and 5–20%, based on the weight of the resin, of a compound of the formula

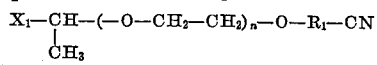

where $X_1$ is a radical selected from the group consisting of the phenyl, mono- and dichlorophenyl and mono- and dimethyl phenyl radicals, $R_1$ is an alkylene radical of 2–4 carbon atoms, to each of which carbon atoms is attached at least 1 hydrogen atom, and $n$ is an integer from 0 to 1.

2. A plasticised composition as set forth in claim 1, wherein $R_1$ is an ethylene radical.

3. A plasticised composition as set forth in claim 1, wherein $R_1$ is a propylene radical and the nitrile group is connected directly to a methylene group thereof.

4. A plasticised composition as set forth in claim 1, wherein $R_1$ is a tetramethylene radical.

5. A plasticised composition as set forth in claim 1, wherein the polymeric resin is a vinylidene chloride-vinyl chloride copolymer.

6. A plasticised composition as set forth in claim 1, wherein the polymeric resin is polyvinylidene chloride.

7. A plasticised composition as set forth in claim 1, wherein the resin is a copolymer of vinylidene chloride, vinyl chloride, and acrylonitrile.

8. A plasticised composition as set forth in claim 1 wherein said compound is alpha methyl benzyl beta cyan ethyl ether.

9. A plasticised composition as set forth in claim 1 wherein said compound is alpha methyl 2:4 dimethyl benzyl beta cyan ethyl ether.

10. A plasticised composition as set forth in claim 1 wherein said compound is alpha methyl benzyl beta cyan ethoxy-ethyl ether.

11. A plasticised composition as set forth in claim 1 wherein said compound is alpha methyl benzyl 4 cyan butyl ether.

DONALD FAULKNER.

REFERENCES CITED

The following references are of record in the file of this patent:

UNITED STATES PATENTS

| Number | Name | Date |
| --- | --- | --- |
| 2,239,515 | Bartlett et al. | Apr. 22, 1941 |
| 2,319,634 | Sauser | May 18, 1943 |
| 2,337,635 | Bogin | Dec. 28, 1943 |
| 2,372,615 | Thomas et al. | Mar. 27, 1945 |
| 2,435,869 | Bruson et al. | Feb. 10, 1948 |
| 2,437,905 | Bruson et al. | Mar. 16, 1948 |